US006949499B2

(12) United States Patent
Lai et al.

(10) Patent No.: US 6,949,499 B2
(45) Date of Patent: Sep. 27, 2005

(54) ANTI-FOAM COMPOSITION

(75) Inventors: Kuo-Tsai G. Lai, Clifton Park, NY (US); Christine J. Phillips, Slingerlands, NY (US); Brenda S. Wutzer, Loudonville, NY (US)

(73) Assignee: General Electric Company, Pittsfield, MA (US)

( * ) Notice: Subject to any disclaimer, the term of this patent is extended or adjusted under 35 U.S.C. 154(b) by 183 days.

(21) Appl. No.: 10/181,701

(22) PCT Filed: Jan. 18, 2001

(86) PCT No.: PCT/US01/01693

§ 371 (c)(1), (2), (4) Date: Nov. 18, 2002

(87) PCT Pub. No.: WO01/52965

PCT Pub. Date: Jul. 26, 2001

(65) Prior Publication Data

US 2003/0211961 A1 Nov. 13, 2003

(51) Int. Cl.[7] .............................. C11D 3/37; C11D 9/36; C11D 17/08; B01D 19/04

(52) U.S. Cl. ....................... 510/441; 510/349; 510/466; 510/476; 510/477; 510/511; 516/117

(58) Field of Search ................................ 510/466, 476, 510/477, 511, 349, 441; 516/117

(56) References Cited

U.S. PATENT DOCUMENTS

| | | | | |
|---|---|---|---|---|
| 3,455,839 A | | 7/1969 | Rauner | 252/321 |
| 4,421,666 A | | 12/1983 | Hempel et al. | 252/140 |
| 4,486,336 A | | 12/1984 | Pape | 252/321 |
| 4,652,392 A | | 3/1987 | Baginski et al. | |
| 4,732,694 A | * | 3/1988 | Gowland et al. | 516/117 |
| 4,806,266 A | | 2/1989 | Burrill | 252/174.15 |
| 4,818,292 A | | 4/1989 | Iley et al. | 106/210 |
| 4,894,177 A | | 1/1990 | Starch | |
| 4,927,557 A | | 5/1990 | Revis et al. | 252/174.15 |
| 5,082,590 A | | 1/1992 | Araud | 252/321 |
| 5,190,694 A | | 3/1993 | Osberghaus et al. | 252/321 |
| 5,238,596 A | | 8/1993 | Smith | 252/174.15 |
| 5,275,822 A | | 1/1994 | Valentine et al. | 424/489 |
| 5,318,718 A | | 6/1994 | Seiter et al. | 252/174.15 |
| 5,456,855 A | | 10/1995 | De Cupere | 252/174.15 |
| 5,540,856 A | | 7/1996 | Wevers et al. | 510/347 |
| 5,589,449 A | | 12/1996 | Kolaitis et al. | 510/466 |
| 5,612,410 A | | 3/1997 | Kondo et al. | 524/863 |
| 5,668,101 A | | 9/1997 | Kolaitis et al. | 510/466 |
| 5,686,404 A | | 11/1997 | Jeuniaux | 510/466 |
| 5,767,053 A | | 6/1998 | Germain et al. | 510/349 |
| 5,773,407 A | | 6/1998 | Lai et al. | 510/466 |
| RE35,893 E | | 9/1998 | Valentikne et al. | 424/489 |
| 5,804,544 A | | 9/1998 | Powell et al. | 510/347 |
| 5,824,739 A | | 10/1998 | Kondo et al. | 524/860 |
| 5,846,454 A | * | 12/1998 | Koczo et al. | 516/11 |
| 5,858,279 A | | 1/1999 | Lunski et al. | |
| 5,861,368 A | | 1/1999 | Kolaitis et al. | 510/466 |
| 5,990,181 A | * | 11/1999 | Spyropoulos et al. | 516/118 |

FOREIGN PATENT DOCUMENTS

| | | | | |
|---|---|---|---|---|
| DE | 3633519 A1 | | 4/1988 | |
| EP | 0 636 684 A2 | | 2/1995 | |
| EP | 0 718 018 A2 | | 6/1996 | |
| EP | 718018 | * | 6/1996 | B01D/19/04 |
| EP | 0684303 A3 | | 7/1996 | |
| WO | WO 99/29816 | | 6/1999 | |

OTHER PUBLICATIONS

International Search Report dated Apr. 17, 2001, International Application No. PCT/US01/01693, Filed Jan. 18, 2001, 7 pages, Apr. 5, 2001.

* cited by examiner

*Primary Examiner*—Brian P. Mruk

(57) ABSTRACT

A composition for use as an anti-foam in laundry detergent wherein the anti-foam active ingredient is released slowly throughout the wash and rinse cycle.

23 Claims, No Drawings

ANTI-FOAM COMPOSITION

CROSS-REFERENCE TO RELATED APPLICATIONS

This application claims priority to U.S. Application Ser. No. 60/176,528, filed Jan. 18, 2000, which is incorporated herein by reference in its entirety.

TECHNICAL FIELD

The present invention is directed to an anti-foam composition, and more specifically to a time-release anti-foam composition for use in laundry detergents.

BACKGROUND

Many traditional anti-foam agents in laundry detergents will defoam at the beginning of the wash cycle, so there is no foam at the beginning of the cycle. This is not desirable because consumers assume that the detergent is not performing properly. Preferably, foam is produced at the beginning of the wash cycle, and then reduced throughout the remainder of the wash cycle. By reducing the amount of foam, the detergent is more effective at cleaning and removing stains. Often, though, at the end of the wash cycle, the anti-foam agent has been exhausted, and there is no anti-foam agent remaining to defoam during the rinse cycle.

Anti-foam agents in laundry detergents have been manufactured using various carrier systems. A carrier comprising pre-gelatinised hydrophilic starch (see, for example, U.S. Pat. No. 4,818,292), a modified cellulose (see, for example, U.S. Pat. No. 4,894,177), and encapsulants have been used. The encapsulants include the reaction product of an alkylalkoxysilane and a silicone condensation cure catalyst (see, for example, U.S. Pat. No. 5,773,407). Despite these formulations however, there remains a continuing interest in the development of even further improvements to anti-foam agents for laundry detergents and other applications. It would be particularly beneficial to obtain an anti-foam agent that does not completely defoam at the beginning of the wash cycle, and which also does not exhaust its defoaming capability over the course of the wash cycle.

SUMMARY OF THE INVENTION

In one aspect, an anti-foam composition comprises a swellable, time-release carrier, one or more anti-foam active ingredients, and a solvent.

In another aspect, a method for making an anti-foam composition with time release properties comprises mixing an anti-foam active ingredient into a swellable, time-release carrier; adding a solvent to the anti-foam active ingredient and carrier to form an agglomerate; and removing the solvent from the agglomerate to dry the agglomerate.

In still another aspect, a method for using the anti-foam composition produced by the method of the present invention comprises adding the anti-foam composition to a detergent, personal care composition, wastewater, or other application desired to be defoamed.

In yet another aspect, a detergent comprises the time-release anti-foam composition of the present invention.

DETAILED DESCRIPTION OF THE INVENTION

In a preferred embodiment, the anti-foam composition comprises from about 0.1 to about 90, preferably from about 0.1 to about 50, even more preferably from about 2 to about 30 parts by weight ("pbw") based on the total composition of the swellable carrier material, from about 5 to about 90, preferably from about 5 to about 50, more preferably from about 10 to about 40 pbw of one or more anti-foam active ingredients; from about 5 to about 90, preferably from about 5 to about 50, more preferably from about 10 to about 40 pbw of the solvent. Optionally, additional materials may be added to the carrier to reduce the amount of higher cost carrier necessary. The additional, lower cost material may be added in an amount of from about 0 to about 90 pbw of the total composition, preferably from about 5 to about 80 pbw, more preferably from about 15 to about 70 pbw of the total composition.

It has been discovered that when a different swellable carrier is used, an anti-foam composition that will be gradually released over time so that it will defoam throughout the entire wash and rinse cycle is produced. The carrier material is a dry powder material that will swell when a solvent is added under the conditions further described below, such that the desired anti-foam active ingredient can be entrapped and held on the carrier. When the carrier contacts water, it swells again, beginning the release of the anti-foam ingredients. The anti-foam agents continue to be released from the swollen carrier materials throughout the wash cycle. Some of the particles may adhere to the articles being washed and continue to dissolve in the subsequent rinse cycle.

In a preferred embodiment, the carrier material comprises one or more acrylic resins that are polymers, copolymers, and combinations thereof. Acrylic resins that are suitable as the acrylic resin component of the composition of the present invention comprise first repeating units derived from one or more monomers selected from (meth)acrylic ester monomers, (meth)acrylic acid monomers and (meth) acrylamide monomers and, optionally, second repeating units derived from one or more monoethylenically unsaturated monomers copolymerizable therewith. As used herein, the term "(meth)acrylic" refers collectively to acrylic and methacrylic, "(meth)acrylate" refers collectively to acrylates and methacrylates, and the term "(meth)acrylamide" refers collectively to acrylamides and methacrylamides.

Suitable (meth)acrylic ester monomers include, for example, alkyl (meth)acrylate monomers, preferably $(C_1–C_{40})$alkyl (meth)acrylate monomers such as, for example, methyl methacrylate, butyl acrylate, ethylhexylmethacrylate; hydroxy$(C_1–C_{40})$alkyl (meth)acrylate monomers such as, for example, hydroxyethyl methacrylate; $(C_4–C_{40})$cycloalkyl (meth)acrylate monomers such as, for example, cyclohexyl methacrylate. Suitable (meth)acrylic acid monomers include, for example, acrylic acid, methacrylic acid. Suitable (meth)acrylamide monomers include acrylamide and methacrylamide. Suitable copolymerizable monomers include, for example, monoethylenically unsaturated carboxylic acids such as, for example, itaconic acid; maleimide monomers such as, for example, N-alkyl maleimides, N-aryl maleimides, maleic anhydride, vinyl esters such as, for example, vinyl acetate, vinyl versatate and vinyl propionate.

As used herein, the term "$(C_1–C_{40})$alkyl" or means a linear or branched alkyl group containing from 1 to 40 carbons per group, such as, for example, methyl, ethyl, propyl, iso-propyl, n-butyl, iso-butyl, sec-butyl, tert-butyl, pentyl, hexyl, preferably from 8 to 30 carbons per group.

In a preferred embodiment, the acrylic resin is crosslinked or has a weight average molecular weight such that it is swellable as a three dimensional microgel in a polar solvent such as water.

In a preferred embodiment, the acrylic resin comprises a resin or combination of resins selected from polymethylmethacrylate, polyacrylic acid, polyacrylamide, polymethacrylic acid, polyacrylonitrile, and copolymers or combinations thereof. In a highly preferred embodiment, the acrylic resin is polyacrylic acid. Acrylic resins that may be used as the carrier material are commercially available, for example, Carbopol® EZ-1 and EZ-2 resins, Permulen® TR-1 resin, Ultrez® 10 resin, ETD® 2001, 2020 and 2050 resins, and the like, commercially available from The B. F. Goodrich Company, Cleveland, Ohio.

Anti-foam active ingredients are generically known in the art and are commercially available. Compositions suitable as the anti-foam active ingredients are those that can be incorporated into the carrier as anti-foam agents, are compatible with the carrier, and effectively defoam in a time-release fashion. Effective anti-foam active ingredients include oily substances that are not water soluble, for example a silicone. An example of a silicone-based anti-foam is a silicone oil that is a polydiorganosiloxane combined with hydrophobic silica as disclosed in U.S. Pat. No. 4,012,334 (General Electric Co.).

The anti-foam active ingredient preferably includes one or more of a polydiorganosiloxane fluid, a silicone resin, a high molecular weight silicone gum, and precipitated silica or fumed silica or a combination thereof. Other components, for example, surfactants, glycerol, petroleum waxes, paraffin waxes, synthetic waxes, may be added to form the anti-foam active ingredient.

Preferred polydiorganosiloxane fluids are those having the repeating structure:

$$—(R_2SiO)_x—$$

wherein each R is independently alkyl or aryl, preferably $(C_1–C_{40})$alkyl, more preferably, methyl, and x is an integer of at least 10, preferably at least 20. Preferred polydiorganosiloxanes are polydimethylsiloxanes. Polydisiloxanes are well known in the art and are commercially available.

Preferred silicone resins are silicone resins according to the formula:

$$M_aQ_b$$

wherein M is $R^1{}_3SiO_{1/2}$ and Q is $SiO_{4/2}$, wherein each $R^1$ is independently alkyl or aryl, preferably $(C_1–C_{40})$alkyl, or $(C_2–C_{40})$alkenyl, more preferably, methyl or vinyl, wherein a and b are chosen such that the ratio of M:Q is from about 0.5:1 to about 1.2:1. Preferred silicone resins are methylpolysiloxane resins, which are well known in the art and are commercially available.

Useful high molecular weight silicone gums are polydiorganosiloxanes, especially polydialkylsiloxanes and polyalkylarylsiloxanes. The high molecular weight silicone gums generally have a number average molecular weight (Mn) in excess of 140,000 and typically in the range of 140,000 to 350,000. Alternatively, the mass molecular weight is in excess of 200,000 and is typically in the range of 200,000 to about 1,000,000. It is generally known in the art that silicone gums typically have a viscosity of about 500,000 to about 100 million centistokes at 25° C. Specific examples of useful high molecular weight silicone gums include polydimethyl siloxane, (polydimethylsiloxane) (methylvinylsiloxane) copolymer, polydimethylsiloxane/methylvinylsiloxane copolymer, polyphenylmethylsiloxane, alpha,omega-bis(hydroxy)polydimethylsiloxane, poly (dimethylsiloxane)(diphenyl siloxane)-(methylvinylsiloxane) copolymer and mixtures thereof.

As used herein, "$(C_2–C_{40})$alkenyl" means a straight or branched chain alkenyl group containing from 2 to 40 carbon atoms per group and at least one double bond between two carbon atoms per group, such as, for example, vinyl, propenyl and butenyl.

As used herein, the term "aryl" means a monovalent unsaturated hydrocarbon ring system containing one or more aromatic rings per group, which may optionally be substituted on the one or more aromatic rings, preferably with one or more $(C_1–C_{40})$alkyl groups and which, in the case of two or more rings, may be fused rings, including, for example, phenyl, 2,4,6-trimethylphenyl, 2-isopropylmethylphenyl, 1-pentalenyl, naphthyl, and anthryl.

Surfactants that may be used in the anti-foam ingredient include silicone-based surfactants, as well as inorganic-based or organic-based surfactants, such as, for example, anionic, nonionic, cationic Zwitterionic and amphoteric surfactant compounds and mixtures thereof. Preferred surfactants are anionic and nonionic surfactant compounds. Examples of anionic surfactants include alkali metal salts of organic sulfates and sulphonites, such as sodium and potassium alkyl sulfates; phosphate esters; and sucrose esters. Examples of nonionic surfactants include the reaction products of alkylene oxides (usually ethylene oxide) with alkyl phenols, the condensation products of aliphatic alcohols with ethylene oxide, products made by condensation of ethylene oxide with the reaction products of propylene oxide and ethylenediamine, long-chain tertiary amine oxides, long-chain tertiary phosphine oxides and dialkyl sulphoxides. Examples of suitable cationic surfactants include alkylamine salts, quaternary ammonium salts, sulphonium salts and phosphonium salts. Examples of amphoteric surfactants include imidazoline compounds, alkylaminoacid salts and betaines. Suitable surfactants are known in the art and are commercially available.

Compounds suitable for use as the solvent includes most polar solvents, preferably water. With water and many other polar solvents, an inorganic base, such as sodium hydroxide or potassium hydroxide, is commonly added to achieve a maximum swelling effect. Less polar or non-polar solvents can also be used as the solvent of the present invention if an organic base such as triethanolamine is added. Other solvents that hydrogen bond with the swellable polymer are also suitable, such as polyhydroxy and polyethoxy reagents like anhydrous non-ionic surfactants, polyols, glycol-silane copolymers, polyethylene oxide, fully hydrolyzed polyvinyl alcohol, and the like.

The size of the granules can be controlled by the amount of solvent added to the mixture. If a fixed amount of solvent is added, a grinder or similar apparatus may be used to break up the agglomerates and create a desired particle size range that is compatible with the detergent granules.

The time-release anti-static composition may optionally further comprise starches and other polysaccharides; silica; precipitated silica; fumed silica; silica gel; aluminum silicate; titanium dioxide; mica; cellulose; fatty acids, such as $C_{12}–C_{20}$ fatty acids, such as for example, capric, lauric, myristic, palmitic, stearic, and the like; fatty alcohols such as stearyl alcohol and tallow $(C_{16}–C_{18})$ alcohols; fatty acid esters such as ethyl myristate, ethyl stearate, methyl palmitate, glycerol monostearate and the like; urea; inorganic salts, such as sodium sulfate; sodium carbonate; clay materials; zeolites, such as sodium aluminum silicates (well-known commercially as zeolites A and X); mixtures of these materials; and other inorganic particles along with the carrier material of the present invention.

The cellulose material may comprise one or more substituted or unsubstituted alkyl ethers of cellulose, and salts of carboxyalkyl cellulose. Preferred substituted alkyl ethers of cellulose are $(C_1–C_6)$alkyl, more preferably, methyl or ethyl ethers of cellulose and those having mixed substituents, such as hydroxypropyl methyl cellulose. Unsubstituted alkyl ethers of cellulose include, for example, hydroxypropyl ethers of cellulose. Salts of carboxyalkyl cellulose include alkaline metal salts of carboxyalkyl cellulose, preferably carboxy$(C_1–C_6)$alkyl cellulose, such as for example, sodium carboxymethyl cellulose. Cellulose materials are known in the art and are commercially available.

The starches and other polysaccharides may comprise native starch, such as corn, rice, potato, maize and wheat starch, pregelatinised or chemically modified starch, and water soluble carbohydrate based materials, such as maltodextrin, dextrose, sucrose, fructose, mannitol, sorbitol, corn syrups, mixtures thereof, and the like. Starches and other polysaccharide materials are known in the art and are commercially available.

If a high viscosity anti-foam active ingredient is used, it may be diluted with a solvent to make it more manageable for entrapping on the carrier. Any solvent that is compatible with the anti-foam active ingredient and that will not dissolve the carrier material may be used. Preferably, the solvent will be a non-polar, aliphatic solvent. Examples of suitable solvents include, but are not limited to, methylene chloride and paraffinic hydrocarbon solvents such as Isopar® C and Isopar® E, commercially available from Textile Chemical Co.

Other optional ingredients may be used in the time-release anti-foam compositions, such as dyes, colorants, brighteners, enzymes, softeners, fragrance and the like, which are known in the art.

In a preferred embodiment, the method for making the anti-foam composition comprises: adding an anti-foam active ingredient to a swellable carrier material, adding the solvent capable of swelling the carrier and mixing, and then removing the solvent, so that upon removal of the solvent, the anti-foam active ingredient is entrapped in the swellable carrier. When the solvent is removed, particles containing the entrapped anti-foam active ingredient remain. These may be added to powdered detergents for use as defoamers in laundry applications.

In a first preferred embodiment, the method for making the anti-foam further comprises adding the solvent slowly to the mixture of anti-foam active ingredient and swellable carrier while stirring to agglomerate the mixture into granules, then removing the solvent by heating. The amount of solvent is controlled by the desired particle size; once a desired particle size is reached, no more solvent is added. Optionally, a second solvent may be added to the anti-foam active ingredient to reduce the viscosity, as previously discussed.

In a second preferred embodiment, the method for making the anti-foam further comprises adding a fixed amount of the solvent to the mixture of anti-foam active ingredient and swellable carrier while stirring to agglomerate the mixture into granules, then removing the solvent by drying. Once the granules are dry, the particles may be ground to a desired range. Optionally, a second solvent may be added to the anti-foam active ingredient to reduce the viscosity, as previously discussed.

While not wishing to be bound by theory, it is believed that the swellable polymer carrier in the dry state is a very tightly coiled molecule. Upon adding the solvent, the molecule begins to hydrate and partially uncoil. During the uncoil stage, the anti-foam active ingredient is adsorbed by the swellable polymer carrier. To achieve maximum uncoil of the polymer chain for full adsorption of the anti-foam ingredient, the acidic polymer carrier is preferably neutralized by an inorganic base, such as sodium hydroxide or potassium hydroxide, particularly if water or another polar solvent is involved. If a less polar or non-polar solvent is used, it may be neutralized with an organic base, such as triethanolamine. Neutralization ionizes the molecule and generates negative charges along the backbone of the polymer. These negative charges in close proximity to one another begin to cause electrostatic repulsion, and the repulsion of these negative portions of the molecule cause the polymer to uncoil more, creating an extended three-dimensional structure. This allows the anti-foam active ingredient to be fully entrapped in the swollen polymer matrix.

Preferably, the one or more anti-foam active ingredients are added to the swellable carrier by slow addition. The solvent is then added with stirring to agglomerate the mixture. Once the particles are fully swollen and the anti-foam active ingredients have been entrapped, the solvent is then removed. Preferably, the solvent is removed by heating.

The anti-foam composition of the present invention may also be used for applications other than washing, such as defoaming of pulps, wastewaters, oil emulsions, dye solutions and the like.

The following examples are to illustrate the invention and are not to be construed as limiting the claims.

EXAMPLES

Various time-release anti-foam compositions were produced in the following way: a swellable polymer carrier was added to a 100 ml stainless steel beaker. An anti-foam compound (such as was disclosed in U.S. Pat. No. 4,012,334) was made and mixed with Isopar C. The anti-foam/Isopar® C mixture was slowly added to the swellable polymer bed with constant stirring. Finally, water was added slowly to agglomerate the mixture into granules having a desired particle size range. The beaker was then heated at 80 to 110° C. to remove the Isopar® C and water.

The Compositions Tested in a Detergent Prototype are as Follows:

A—Silicone based anti-foam compound entrapped in acrylic resin[1] and cornstarch B—Silicone based anti-foam compound entrapped in xanthan gum[2]

C—Silicone based anti-foam compound entrapped in xanthan gum[2]

D—Silicone based anti-foam entrapped in acrylic resin[3]

E—Silicone based anti-foam compound entrapped in polysaccharide[4]

TABLE 1

| Ingredient (grams) | Anti-foam compositions with an acrylic resin carrier and optional additional carrier material | | | | |
|---|---|---|---|---|---|
| | A | B* | C* | D | E* |
| Anti-foam | 1.00 | 0.17 | 0.63 | 0.68 | 0.19 |
| Acrylic resin | 0.58 (Carbopol ® EZ-1)[1] | None | None | 1.62 (Carbopol ® EZ-2)[3] | None |
| Additional Carrier | 1.04 (corn starch) | 1.01 (xanthan gum[2]) | 3.99 (xanthan gum[2]) | None | 1.02 Seakem ® HGT Agarose[4] |
| Isopar ® C | 2.00 | 0.29 | 1.01 | 1.37 | 0.33 |
| Water | 0.78 | 0.47 | 2.97 | 0.50 | 2.54 |

[1]Carbopol ® EZ-1 resin, commercially available from The B. F. Goodrich Company, Cleveland, OH.
[2]Kelzan ® S xanthan gum, commercially available from Monsanto Life Science, Chicago, IL.
[3]Carbopol ® EZ-2 resin, commercially available from The B. F. Goodrich Company, Cleveland, OH.
[4]Seakem ® HGT agarose, commercially available from FMC Bioproducts, Rockland, ME.
*Comparative Example The anti-foam compositions were evaluated in standard wash and rinse cycles using a General Electric Co. washing machine using 80 grams of detergent prototype with 500 ppm of the anti-foam composition of the present invention for each load. Foam height was measured at 0, 2, 6 and 12 minutes during the wash cycle. Foam coverage was measured in the rinse cycle at 1 minute and at the end of the cycle as the percentage of suds coverage, from 0 to 100 % coverage. Results are shown in Tables 2 and 3.

TABLE 2

| Time (minutes) | Foam Height (inches) in Wash Cycle — Composition | | | | |
|---|---|---|---|---|---|
| | A | B | C | D | E |
| 0 | 0 | 0 | 0 | 0 | 0 |
| 2 | 1.25 | 0 | 0 | 1.5 | 0 |
| 6 | 0.25 | 0.0625 | 0 | 1.25 | 0 |
| 12 | 0.5 | 0.125 | 0 | 0.25 | 0.0625 |

TABLE 3

| Time (minutes) | Foam Coverage* in Rinse Cycle — Composition | | | | |
|---|---|---|---|---|---|
| | A | B | C | D | E |
| 1 min. | 45 | 25 | 25 | 35 | 20 |
| End | 65 | 35 | 50 | 35 | 40 |

*Foam coverage was measured on a scale of 0 to 100%, with 100% being full foam coverage.

The results from Table 2 indicate that sample D has the best time-release properties. This sample uses Carbopol® EZ-2, an acrylic resin, as the swellable carrier. At two minutes, the foam height was highest, then the anti-foam was gradually released into the wash water, reducing the foam height as the wash cycle continued.

Sample A was prepared with an acrylic resin (Carbopol® EZ-1) and low cost cornstarch to evaluate the effect of cornstarch as an additional carrier on the time-release properties. Sample A showed similar foam height at the beginning of the cycle, then the anti-foam was gradually released to reduce the foam height at six minutes, but the foam height increased again at twelve minutes.

Samples B, C and E were comparative examples that did not contain acrylic resin as the swellable carrier; they contained carriers routinely used. The time-release properties of samples B, C and E were not as good as those of the samples containing acrylic resin. Foam was suppressed at the early stages, but the foam height gradually built up, signally consumption of the anti-foam at an early stage in the wash cycle.

Table 3 also shows that Sample D has superior foam coverage in the rinse cycle.

As shown by the above data, the present composition allows initial foaming at the beginning of the wash cycle, but is gradually released over time so that it will continue to defoam throughout the entire wash and rinse cycle, and is not exhausted.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. An anti-foam composition comprising a swellable, time-release carrier comprising a crosslinked acrylic resin having an anti-foam active ingredient entrapped in the crosslinked acrylic resin that swells in contact with a solvent; and a base additive; and wherein the swellable time release carrier is swellable in contact with a solvant an anti-foam active ingredient.

2. The anti-foam composition of claim 1 wherein the acrylic resin comprises repeating units derived from (meth) acrylic ester monomers, (meth)acrylic acid monomers, (meth)acrylamide monomers, or a combination comprising at least one of the foregoing monomers.

3. The anti-foam composition of claim 2, wherein the (meth)acrylic ester monomer is a ($C_1$–$C_{40}$)alkyl (meth)

acrylate monomer, a hydroxy($C_1$–$C_{40}$)alkyl (meth)acrylate monomer, or a ($C_4$–$C_{40}$)cycloalkyl (meth)acrylate monomer; the (meth)acrylic acid monomer is acrylic acid or methacrylic acid, and the (meth)acrylamide monomer is acrylamide or methacrylamide.

4. The anti-foam composition of claim 2, wherein the acrylic resin further comprising repeating units derived from a monoethylenically unsaturated monomer.

5. The anti-foam composition of claim 4, wherein the monoethylenically unsaturated monomer is a monoethylenically unsaturated carboxylic acid, an N-alkyl maleimide, an N-aryl maleimide, or a vinyl ester.

6. The anti-foam composition of claim 5, wherein the monoethylenically unsaturated monomer is itaconic acid, maleic anhydride, vinyl acetate, vinyl versatate, or vinyl propionate.

7. The anti-foam composition of claim 1, wherein the acrylic resin is polymethylmethacrylate, polyacrylic acid, polyacrylamide, polymethacrylic acid, polyacrylonitrile, copolymers comprising at least one of the foregoing polymers, or a combination comprising at least one of the foregoing polymers.

8. The anti-foam composition of claim 7, wherein the acrylic resin is a polyacrylic acid.

9. The anti-foam composition of claim 1, wherein the anti-foam active ingredient comprises a silicone in combination with a hydrophobic silica.

10. The anti-foam composition of claim 9, wherein the anti-foam active ingredient comprises, in combination with silica, a silicone fluid, a silicone resin, a high molecular weight silicone gum, or a combination of at least one of the foregoing silicones.

11. The anti-foam composition of claim 10, wherein the silicone fluid has the repeating structure —$(R_2SiO)_x$—, wherein each R is independently alkyl or aryl, and x is an integer of at least 10.

12. The anti-foam composition of claim 10, wherein the silicone resin comprises the structure $M_aQ_h$ wherein M is $R^1{}_3SiO_{1/2}$ and Q is $SiO_{4/2}$, wherein each R is independently alkyl, alkenyl, or aryl, and the ratio of a:b is from about 0.5:1 to about 1.2:1.

13. The anti-foam composition of claim 10, wherein the high molecular weight silicone gum has a number average molecular weight in excess of 140,000.

14. The anti-foam composition of claim 10, wherein the anti-foam active ingredient further comprises a surfactant.

15. The anti-foam composition of claim 1, comprising, based on the total weight of the composition, from 0.1 to 90 parts by weight of the swellable time-release carrier, from 5 to 90 parts by weight of the anti-foam active ingredient.

16. The anti-foam composition of claim 1, comprising, based on the total weight of the composition, from 0.1 to 50 parts by weight of the swellable time-release carrie and from 5 to 50 parts by weight of the anti-foam active ingredient.

17. The anti-foam composition of claim 1, comprising, based on the total weight of the composition, from 2 to 30 parts by weight of the swellable time-release carrier and from 10 to 40 parts by weight of the anti-foam active ingredient.

18. A method for making an anti-foam composition, comprising mixing an anti-foam active ingredient into a crosslinked, swellable time-release carrier;

adding a solvent to the anti-foam active ingredient and carrier to form an agglomerate;

adding a base additive to the anti-foam active ingredient and carrier; and removing the solvent from the agglomerate to dry the agglomerate, whereby the anti-foam active ingredient is entrapped in the crosslinked, swellable, time-release carrier.

19. The method of claim 18, wherein adding the solvent is stopped when the agglomerates reach a pre-determined particle size.

20. The method of claim 18, further comprising grinding the dried agglomerate.

21. A personal care composition or detergent comprising the anti-foam composition made by the method of claim 18.

22. An anti-foam composition comprising a time-release carrier comprising a crosslinked acrylic resin having a weight average molecular weight such that is swellable as a three dimensional microgel in a polar solvent;

a base additive; and an anti-foam active ingredient wherein the antifoam active ingredient is entrapped in the crosslinked acrylic resin.

23. An anti-foam composition consisting essentially of:

a swellable, time release carrier comprising a crosslinked acrylic resin;

a base additive; and an anti-foam active ingredient wherein the anti-foam active ingredient is entrapped in the crosslinked acrylic resin.

* * * * *